G. F. Schaffer,
Dental Impression Cup.
N° 53,347. Patented Mar. 20, 1866.
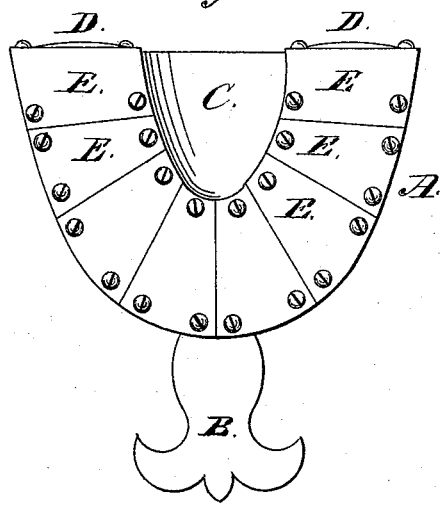
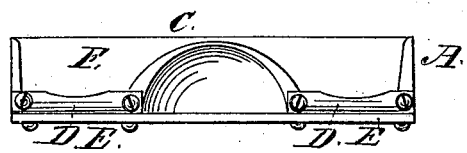
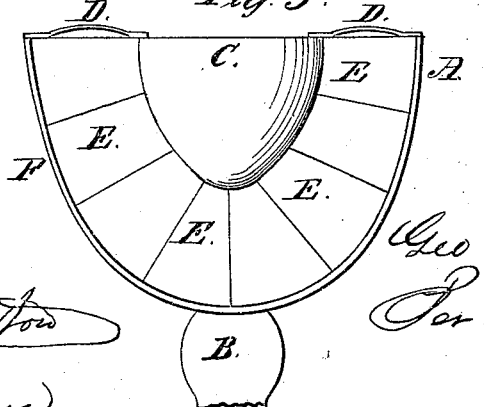

ated March 20, 1866.

UNITED STATES PATENT OFFICE.

GEORGE F. SCHAFFER, OF NEW YORK, N. Y.

IMPROVEMENT IN DENTAL IMPRESSION-CUPS.

Specification forming part of Letters Patent No. 53,347, dated March 20, 1866.

*To all whom it may concern:*

Be it known that I, GEORGE F. SCHAFFER, of the city, county, and State of New York, have invented a new and useful Improvement in Dental Impression-Cups; and I do hereby declare that the following is a full, clear, and exact description thereof, which will enable others skilled in the art to make and use the same, reference being had to the accompanying drawings, forming part of this specification, in which—

Figure 1 is a under-side view of an impression-cup made according to my invention. Fig. 2 is a view of it seen when looking at its open end. Fig. 3 is a plan.

This improvement in impression-cups is intended to enable an operator to take an impression of a patient's mouth for a full or partial set of teeth.

The ordinary method of taking an impression of the mouth for a partial set—that is to say, when some of the natural teeth remain in the jaw—is to break away the bottom of an impression-cup to allow such natural teeth to project through it.

This invention consists in making the bottom of the cup in sections, which are separately fastened to the lower edges of the rim and arch in such a way as to be easily removable, thereby enabling a dentist to adjust and prepare the same cup to be used for impressions for whole sets or partial sets at pleasure without injury to the cup.

The invention also consists in connecting the arch of the cup with the outer rim by bars, which give steadiness and strength to the cup when any of the sectional bottom pieces are removed.

The letter A designates the impression-cup. As ordinarily made such cups are swaged, or cast, or otherwise formed in one piece of metal, having a handle soldered or otherwise formed on it on its front or convex side. They are generally made for taking impressions for whole sets; but sometimes such cups are made for partial sets, the said cups, however, whatever their size, whether for whole or partial impressions of the jaw, being always made in one piece. It results from this method of making impression-cups that a dentist is either compelled to make a special cup for each partial set, in order to suit the variations in the positions of the plate-work and the variations in the positions of the natural teeth left in the jaw, or to prepare a large cup by making a hole or holes through its bottom to receive the natural teeth, or to place in the cup a body of wax of such thickness as will allow the impression to be taken without letting the tooth or teeth left in the jaw reach the bottom of the cup. The latter method is not convenient, because of the great bulk of wax forced into the patient's mouth, and the usual course in the profession is to take a full-sized cup for each case of partial sets and cut an opening or openings in its bottom, thereby destroying the cup for future use and increasing the expense of the operation, besides consuming much time both of the dentist and of the patient, since the latter is compelled to wait until the cup is prepared for use.

My invention avoids these disadvantages and enables an operator to take all kinds of impressions with the same cup by making its bottom in sections and attaching them to its outer rim, so that any of them can be readily removed and replaced.

F designates the upright curved piece which forms the outer rim of the cup, to which the handle B is fixed by soldering or riveting, or they may be cast together.

C is the arch to fit the roof of the mouth. The several sections which make up the bottom of the cup are designated by the letter E. Their ends are severally secured, by screws or other suitable means, to the under edge of the rim F and to the under edge of the arch C, which latter is in this example made separately from the rim F, and is connected with it by means of the sectional bottom pieces, E, and by the outer bars, D D. The bars D D extend from the ends of arch C to the ends of the vertical rim F, across the channel of the cup, which they partially obstruct, so as to hold the wax or plaster, or other material used for taking impressions, from sliding and from displacement.

The bars D D fulfill another office—to wit, that of holding the arch C and the rim F to each other when those sections of the bottom which are near the ends of the cup are removed.

The bars D D may, if desired, be cast or made in one piece with the arch or with the rim F, or the bars D, arch C, and rim F may be formed in one, so as to be one connected piece.

The several sections E can be numbered or marked in any convenient way, so as to designate their places on the cup. I have here shown the bottom divided into eight sections or divisions; but it may be divided into any number of sections more or less than here shown, and they may be of equal or unequal proportions.

What I claim as new, and desire to secure by Letters Patent, is—

1. In dental impression-cups, making their bottoms in sections or separate pieces so secured to the other parts of the cup as to be removable at pleasure, substantially as and for the purpose above set forth.

2. The bars D D, for connecting the arch C and the rim F to each other, substantially as and for the purpose above set forth.

GEORGE F. SCHAFFER.

Witnesses:
M. M. LIVINGSTON,
ALEX. F. ROBERTS.